United States Patent [19]

Hamernik et al.

[11] Patent Number: 4,700,735

[45] Date of Patent: Oct. 20, 1987

[54] FLUID ACTUATED VALVE APPARATUS

[75] Inventors: Edward L. Hamernik, Minneapolis; Daryll D. Patterson, Brooklyn Park, both of Minn.

[73] Assignee: Tescom Corporation, Elk River, Minn.

[21] Appl. No.: 897,915

[22] Filed: Aug. 18, 1986

Related U.S. Application Data

[63] Continuation-in-part of Ser. No. 738,998, May 29, 1985, abandoned.

[51] Int. Cl.⁴ ............................................. F16K 31/163
[52] U.S. Cl. ........................................ 137/270; 137/382; 251/58; 251/250; 251/263; 251/335.2
[58] Field of Search ................... 137/270, 382; 251/58, 251/250, 263, 335.2; 220/85 P

[56]  References Cited

U.S. PATENT DOCUMENTS

| | | | |
|---|---|---|---|
| 1,142,671 | 6/1915 | Carmina | 403/378 X |
| 2,224,708 | 12/1940 | Van Sittert | 74/110 |
| 2,618,458 | 11/1952 | Fosbender | 251/335.2 X |
| 4,260,128 | 4/1981 | Tito | 251/58 |
| 4,552,179 | 11/1985 | Tarusawa et al. | 137/625.65 |
| 4,629,157 | 12/1986 | Tsuchiya et al. | 137/382.5 X |
| 4,637,423 | 1/1987 | Gray | 251/250 X |

FOREIGN PATENT DOCUMENTS

| | | | |
|---|---|---|---|
| 1155296 | 10/1963 | Fed. Rep. of Germany | 220/85 P |
| 1060285 | 3/1954 | France | 251/335.2 |
| 1177123 | 4/1959 | France | 251/335.2 |

Primary Examiner—Gerald A. Michalsky
Attorney, Agent, or Firm—Clayton R. Johnson

[57] ABSTRACT

A bonnet is mounted on an insert support and connected to a valve body to retain a diaphragm in fluid sealing relationship between the body and insert support. The insert support is rotatable relative to the housing of a fluid actuator while being retained in a fixed axial position relative to the housing. A plunger is extended through the insert support to abut against a button that abuts against one side of the diaphragm, the opposite side of which abuts against a valve seat subassembly that is resiliently urged to a valve open condition. The housing mounts a spindle which in turn has an eccentric lobe keyed thereto for moving the plunger toward the diaphragm so that the button flexes the diaphragm to move the seat subassembly to its valve closed position. Piston operated rack mechanism controls the rotation of the lobe for moving the plunger toward the diaphragm. Spring mechanism moves the piston in one direction while fluid under pressure applied to the actuator moves the piston in the opposite direction. The spindle and lobe may be selectively positioned in the housing so that the actuator is for a normally open valve or a normally closed valve. One of the embodiments is of a construction for fitting under a cap of a gas cylinder and replacing a manually operated control valve whereby the flow from cylinder can be controlled from a remote location.

21 Claims, 11 Drawing Figures

FLUID ACTUATED VALVE APPARATUS

CROSS REFERENCE TO RELATED APPLICATIONS

This application is a continuation-in-part application of our application, Ser. No. 738,998, filed May 29, 1985, now abandoned.

BACKGROUND OF THE INVENTION

A fluid operated actuator for operating a valve between a closed condition and an open condition.

In the prior art it is old to provide an actuator having a piston with plunger mechanism attached thereto to move therewith for flexing the diaphragm of a low pressure valve for moving a valve seat to a valve closed condition and to provide a low pressure valve with a piston resiliently retained in a position that the valve seat is retained in a valve closed position until fluid under pressure is applied for moving the piston against a spring so that the valve diaphragm flexes under the action of the valve seat spring acting against the valve seat to move the seat to a valve open condition. Further it is old to provide a relatively large actuator for operating a high pressure valve between open and closed conditions.

In U.S. Pat. No. 2,618,458 to Fosbender an external eccentric (cam) is mounted in abutting relationship with a plunger assembly for operating valving structure between a valve open and a valve closed position, a lever being attached to the cam for manually rotating the cam. French Pat. No. 1,060,285 to Henric discloses structure similar to that referred to in the preceeding sentence, other than for not showing a lever. U.S. Pat. No. 4,260,128 to Tito discloses a valve actuator that includes a piston having a segmented skirt provided with teeth that engage teeth of a rotor to rotate the rotor. The rotor engages the stem of a ball valve to rotor the ball valve about the same axis as the axis of rotation of the rotor. In one embodiment of Tito, a pair of springs urge the piston to move in a direction opposite that from which it moved by pressurized air being applied.

In the pneumatic tool art, U.S. Pat. No. 1,142,671 to Carmina discloses a pin being extended into one groove of a valve to prevent axial movement while permitting rotational movement of the valve relative to a nipple and being extendable into a second groove to retain the valve in an open condition; and U.S. Pat. No. 2,224,708 to Van Sittert discloses a piston operated rack engaging a gear to rotate a cam that in turn moves a plunger and the tool that is attached to the plunger.

Also it is old to provide a manually operated control that will fit under the cap of a gas cylinder for controlling flow from the cylinder.

In order to provide a relatively small actuator for controlling a high pressure valve this invention has been made.

SUMMARY OF THE INVENTION

Fluid actuated valve apparatus for controlling a valve that includes an actuator housing having a plunger movable between valve open and closed positions, eccentric lobe means for moving the plunger between its positions, first means movable under the application of fluid under pressure from a datum position to a second position for operating the lobe to move the plunger from one of its positions to its other position, and spring means for constantly urging the first means to its datum position.

One of the objects of this invention is to provide new and novel means for operating a valve between an open and a closed condition. Another object of this invention is to provide new and novel fluid pressure operated means for controlling the movement of plunger mechanism between valve open and valve closed conditions. In furtherance of the last mentioned object it is a further object of this invention to provide novel rack, pinion and eccentric lobe means that cooperate with one another for controlling the movement of the plunger mechanism.

Still another object of this invention is to provide a novel valve actuator that may be easily converted between one for normally retaining a valve in an open condition to one normally retaining a valve in a closed condition. Another object of this invention is to provide a novel fluid actuated actuator having means for retaining a valve in a fixed axial position while permitting rotatably adjusting the orientation of a valve relative to the actuator housing. An additional object of this invention is to provide novel actuator means for a high pressure valve having mechanism rotatable about a first axis for moving a plunger along a second axis that extends perpendicular to the first axis between valve open and closed positions.

Another object of this invention is to provide novel fluid actuated valve means mountable on a gas cylinder under the cap for the cylinder to control the flow of pressurized fluid from the cylinder.

Referring to FIGS. 1-6, the first embodiment of the invention, generally designated 10, includes an actuator having an actuator housing 11 that has a body 11a with a cylindrical bore (cylinder chamber) 12 opening through the top surface thereof, and a cover 13 secured to the actuator body 11a by screws 14. The cover has a groove for mounting an O-ring 16 for providing a fluid seal between the body and cover 13 which closes the upper end of the bore 12. A threaded aperture (control port) 15 is provided in the cover to open to the cylinder chamber for having a fluid line 17 threaded therein that is connected to a source of pressurized fluid 26. A shut off valve 50 is provided in line 17 and is of a type for permitting fluid flow to the cylinder chamber 12 and alternately blocking fluid flow from source 26 to the chamber and permit pressurized fluid exhausting from the chamber.

A piston 18 has a groove mounting an O-ring 19 that forms a fluid seal between the housing wall that defines bore 12 and the piston, the piston being mounted in bore 12. A first coil spring 22 has one end seated in piston bore 20 and an opposite end seated in housing bore 21 (see FIG. 3) while a second coil spring 25 has one end seated in the piston bore 23 and the opposite end in housing bore 24. Housing bores 21, 24 open to the cylinder chamber and are of much smaller diameters than the diameter of the bore 12. The coil springs resiliently retain the piston in its datum position abutting against the cover 13.

A rack hole 27 that is elongated in a direction parallel to the central axis of the cylinder bore 12 at one end opens through the bottom surface of the actuator body and at the opposite end to the bottom of the cylinder bore 12. An elongated rack 30 has one end secured to the piston by a screw 29 to move therewith, the rack being of sufficient length to extend into the rack hole even when the piston abuts against the cover. The walls of the housing defining the rack hole are of dimensions and a shape to serve as a guide for the rack so that it is only reciprocally movable in a direction parallel to the central axis of the cylinder bore 12.

An eccentric subassembly bore 31 is provided to open through opposite sides of the housing body 11a, extends perpendicular to bore 12 but in spaced relationship thereto and opens to the rack hole. The opposite ends of the cylindrical bore 31 are closed by plates (covers) 32, 33 that are removably secured to the housing body 11a. Bearings 34 are mounted in the opposite ends of the bore 31 and rotatably mount the spindle 35 of the eccentric subassembly 40. The spindle has a spur gear 36 pinned thereto by pin 37 with the teeth of the gear in intermeshing relationship with the teeth of the rack.

The eccentric subassembly 40 also includes an eccentric lobe (cam) that comprises a cylindrical member 41 eccentrically mounted on the spindle and pinned thereto by a pin 42 to rotate therewith while a tubular member 44 is mounted on the cylindrical member with bearings 43 between the cylindrical and tubular members to permit rotation of the tubular member relative the cylindrical member. It is noted the outer peripheral surface of the tubular member is circular and in abutting relationship with one end of a plunger 47.

The plunger extends through the reduced diameter portion 46a of a housing bore 46 that has its central axis perpendicular to the central axis of bore 31 and extends radially outwardly thereof. The enlarged diametric portion 46b of the bore 46 opens through the surface 11m of the actuator housing and has the reduced diameter portion 48a of the insert support 48 extended thereinto to abut against the shoulder formed at the juncture of bore portions 46a, 46b. The insert support is removably retained in the bore 46 in fixed axial relationship relative to the housing 11 by a pair of spaced parallel pins 51 that extend through diametrically opposite portions of an annular groove 52 provided in the reduced diameter insert portion 48a. The pins are removably mounted by the housing body in bores that open to plates 32, 33.

A bonnet 54 has the reduced diameter part of the insert support extended through the reduced diameter part of the bonnet bore 55, the bonnet having lands 59 thereon to facilitate turning the bonnet with a wrench. A high pressure valve, generally designated 56, has a valve body 57 that is generally T-shape or cylindrical shape and includes a first leg 57a threaded into the enlarged diameter part of the bore 55 to retain the non-perforated, flexible metal diaphragm 58 in abutting relationship to the insert support to prevent passage of fluid between the valve chamber 61 in the first leg and the enlarged diametric portion 60a of the plunger bore 60 that extends axially through the insert support. The first leg in abutting against the diaphragm retains the shoulder formed by the enlarged and reduced diametric portions of the insert support 48 against the shoulder formed by the reduced and enlarged bore portions of the bonnet bore 55 so that when the actuator housing 11 is retained in a fixed position and the bonnet rotated, the bonnet, insert support 48 and valve 56 are rotated as a single unit about the central axes of the insert and bonnet bores and housing bore 46.

The plunger 47 extends axially through the reduced bore portion of the insert support and into the enlarged diametric portion thereof to have its end that is opposite the tubular member 44 abut against a button 64 that is axially movable in the enlarged bore portion 60a of the plunger bore. The button has a rounded surface opposite the plunger that abuts against the central part of the diaphragm.

The valve body includes a second leg 57b that has the threaded portion 67b of an inlet fluid passage 67 formed therein for having a line (not shown) for conducting fluid under high pressure thereto. Passage 67 also includes a passage portion 67a that opens to the central part of the valve chamber that is axially opposite of the diaphragm from the button 64. A valve seat subassembly 68 is provided in the valve chamber and is axially movable between an "off" position blocking fluid flow from passage portion 67a to the valve chamber and an "on" position permitting fluid flow from passage portion 67a into the chamber. A coil spring 69 has an end abutting against the valve body wall defining one end of the valve chamber and an opposite end abutting against an enlarged diametric portion of the seat subassembly to constantly resiliently urge the seat subassembly to its "on" position and maintain the subassembly in abutting relationship with the diaphragm on the side thereof axially opposite the button.

The valve body also includes a third leg 57c having the threaded portion 71b of the fluid outlet passage 71 formed therein for having a line (not shown) connected thereto for conducting fluid that passed through the valve chamber away from the valve 56. The portion 71a of the outlet passage opens through the valve body wall defining the valve chamber so that fluid can flow from said chamber regardless of whether the valve seat subassembly is in its "on" or its "off" position.

When no air under pressure is applied through aperture 15 to the cylinder chamber 12, springs 22, 25 retain the piston abutting against the cover while the rack retains the spur gear and thereby the spindle in an angular position that the outer peripheral surface of the tubular member that is the furtherest radial distance from the central axis of the spindle is in abutting relationship with the plunger. As a result the plunger retains the button and thereby the diaphragm in a flexed condition to retain the valve seat subassembly in its off position to block fluid flow from passage 67 into the valve chamber.

When it is desired to operate the valve 56 to its "on" condition, fluid under pressure is applied through port 15 which results in piston 1 moving in the direction of arrow 73 against the action of springs 22, 25 to be more remotely spaced from the cover. As a result the rack is moved in the same direction and through the spur gear causes the spindle to rotate in the direction of arrow 74. As the spindle rotates in the direction of arrow 74, the peripheral surface portion of the tubular member abutting against the plunger becomes progressively more closely adjacent to the central axis of the spindle, it being noted that due to bearings 43, the spindle may rotate relative to the tubular member and/or the tubular member may rotate relative to the plunger. Spring 69 now moves the valve seat subassembly in the direction of arrow 75 away from the opening of passage portion 67a to the valve chamber to permit fluid flow from the passage 67 into the chamber and thence to the outlet passage 71. The valve seat subassembly in moving in the direction of the arrow 75 causes the diaphragm to flex for moving the button and thereby the plunger toward the spindle central axis. The movement of the button in the direction of arrow 75 is limited by the angular rotation of the eccentric lobe 41, 42, 43 in the direction of arrow 74, or if the lobe rotates sufficiently in the direction of arrow 74, by the button abutting against the shoulder formed by the juncture of the reduced and enlarged diametric portions of the plunger bore.

When it is desired to operate the valve 56 to its "off" condition, valve 50 is turned to discontinue applying fluid under pressure to cylinder bore 12 and exhaust fluid from the cylinder bore. Now the springs 22, 25 return the piston to its cover abutting position which in turn through rack 30 rotates the spur gear angularly in the direction opposite arrow 74. This results in the peripheral surface portion of the tubular member abutting against the plunger being progressively more remote from the central axis of the spindle to move the plunger and thereby the button in the direction opposite arrow 75. The button in moving in the direction opposite arrow 75 flexes the diaphragm to move the valve seat subassembly to its "off" position.

Figure 1:
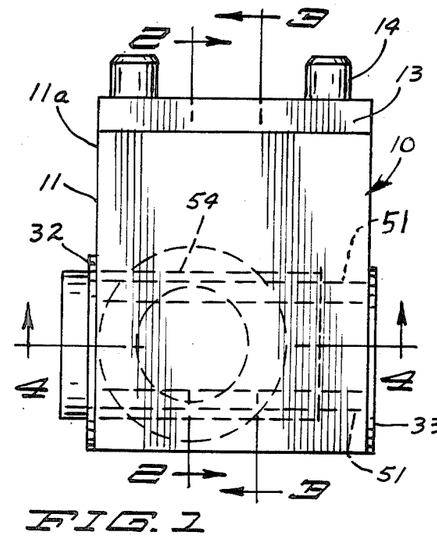
FIG. 1 is a rear view of the first embodiment of the invention which is normally closed.
Figure 2:
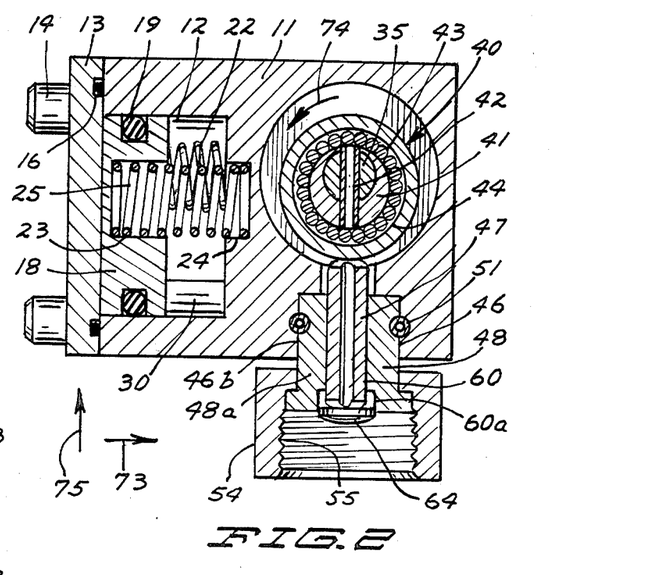
FIG. 2 is a cross sectional view of the actuator assembly generally taken along the line and in the direction of the arrows 2—2 of FIG. 1 to show the actuator mechanism in a valve closed condition.
Figures 3, 4:
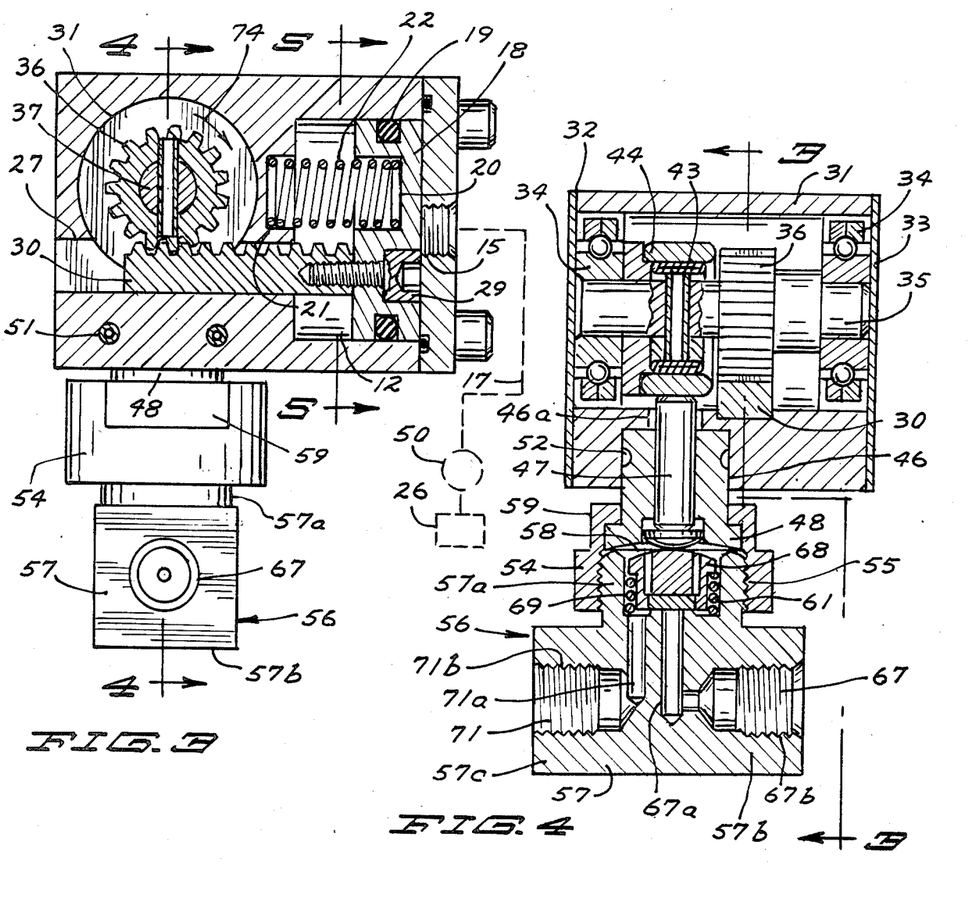
FIG. 3 is in part a side view of the valve and part of the actuator of FIG. 1 and in part a cross sectional view of the rest of the actuator, the part in cross section being generally taken along the line and in the direction of the arrows 3—3 of FIGS. 1 and 4.
FIG. 4 is a cross sectional view of the first embodiment that is taken along the line and in the direction of the arrow 4—4 of FIGS. 1 and 3 that shows the valve in a valve closed condition.
Figures 5, 6, 7, 8:
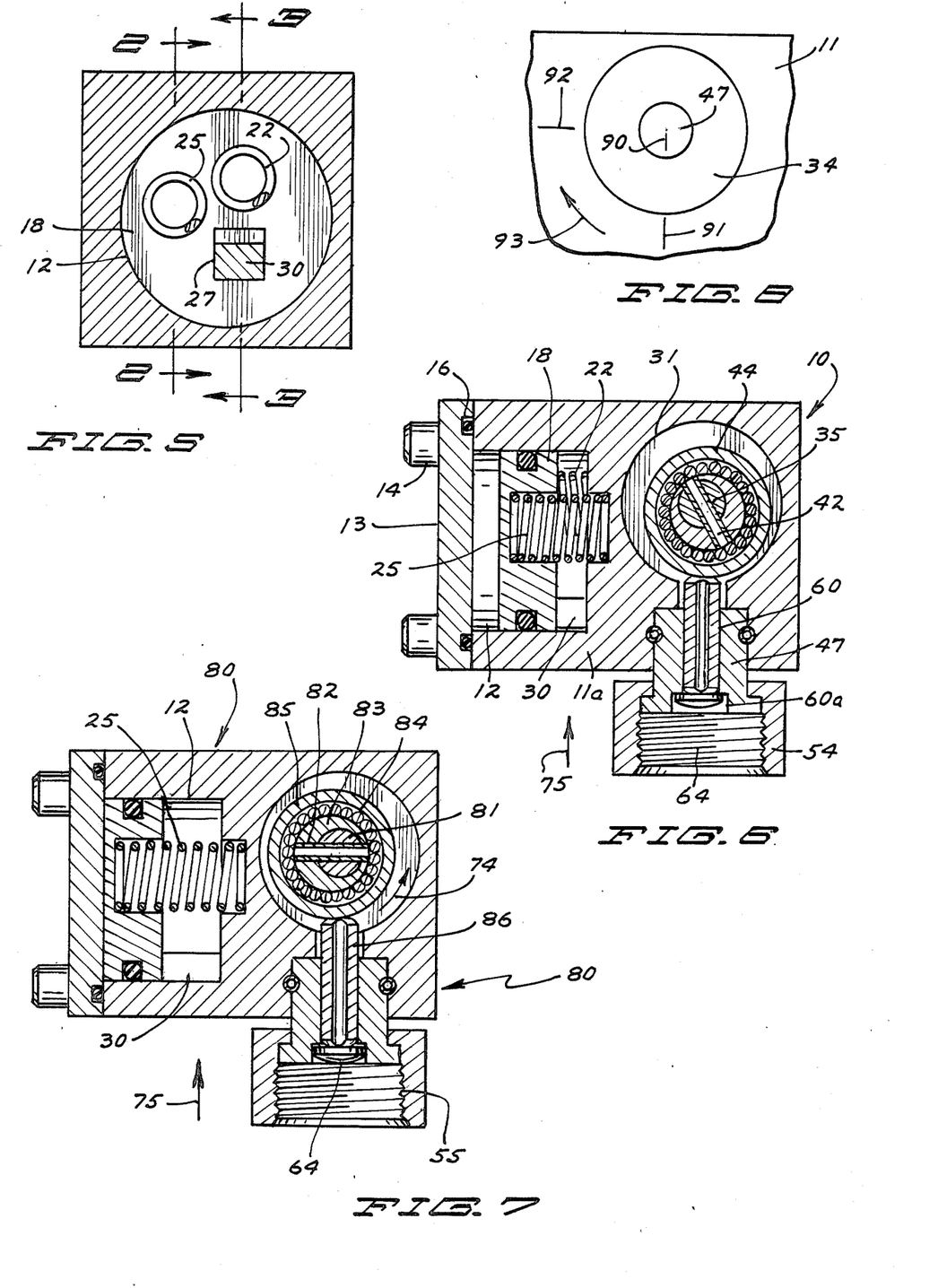
FIG. 5 is a cross sectional view generally taken in along the line and in the direction of the arrows 5—5 of FIG. 3.
FIG. 6 is a view that is the same as FIG. 2 other than it shows the actuator assembly in a valve open condition.
FIG. 7 is a view of the actuator of the second embodiment of the invention which is for a normally open valve and other than for being for a normally open valve is the same as the embodiment of FIG. 2.
FIG. 8 is a fragmentary side view of the actuator with a plate removed to show the marks on the spindle and housing body that facilitate converting the first embodiment to the second embodiment and vice-versa.

For one particular model of the first embodiment, the spindle has to be rotated about 25° between the "off" position of FIG. 2 and the "on" position of FIG. 6. It is noted that in the valve "on" condition the rack does not extend outwardly beyond the hole 27.

Referring to FIG. 7, the second embodiment of the invention, generally designated 80, which is for maintaining valve 56 in a normally "on" condition is of the same construction as the first embodiment except for the differences noted hereinafter. The second embodiment has spring 25 (no spring 22) for constantly resiliently urging the piston toward the cover. Even though the spindle 81, pin 82, cylindrical member 83, bearing 84, tubular member 85 and plunger 86 are of the same construction and mounted in the same manner as the corresponding members 35, 42, 41, 43, 44 and 47 of the first embodiment, they have been designated with numbers different from that of the first embodiment since they are located in different positions when the piston abuts against the cover. That is, in the second embodiment when the piston abuts against the cover the spur gear is angularly positioned so that with the rack in its position most closely adjacent to the cover the pin 82 extends at about right angles to the central axis of the plunger 86 while in the first embodiment when the rack is in its position most closely adjacent to the cover the central axis of the pin 42 is coaxially aligned with the central axis of the plunger 47. Thus when the piston of the second embodiment abuts against the cover 13, the plunger 86 abuts against a peripheral portion of the tubular member 85 that is more closely adjacent to the spindle central axis than the peripheral portion of the tubular member that is of maximum spacing from the spindle central axis. As a result spring 69 retains the valve seat subassembly in a position the high pressure valve 56 is fully open and flexes the diaphragm so that the button either abuts against the shoulder formed at the juncture of the reduced and enlarged diametric portions of the plunger bore or the button retains the plunger 86 in abutting relationship to the tubular member outer peripheral surface.

When air under pressure is applied through the port of the second embodiment, the piston is moved whereby as the spindle is rotated in direction of the arrow 74, the peripheral surface portion of the tubular member abutting against the plunger is progressively further from the spindle central axis. The plunger 86 is moved in the direction opposite arrow 75 until the valve seat subassembly abuts against the valve body wall portion that defines the bottom of the valve chamber to block fluid flow from passage 67 into the chamber. When fluid flow is thus blocked the plunger can not move further in the direction opposite arrow 75 and the rotation of spindle 81 is stopped.

When it is desired to operate the valve 56 of the second embodiment to its open condition air under pressure in bore 12 is exhausted and spring 25 moves the piston to abut against the cover whereby the spindle 81 is rotated in the direction opposite of arrow 74 to its angular position of FIG. 7. The combination of fluid under pressure in passage 67 and spring 69 return the seat subassembly to the valve "on" condition. In so doing the seat subassembly flexes the diaphragm to move the button and thereby the plunger 86 in the direction of arrow 75.

Since air under pressure in passage 67 of the second embodiment aids in returning the movably members of the actuator to their valve "on" condition, only spring 25 is required while in the first embodiment air under pressure in passage 67 does not aid in returning the movable members of the first embodiment to the valve "off" condition an addition spring 22 is provided to aid in returning the piston to its position abutting against cover 13. It is to be noted that spring 22 can be eliminated if spring 25 of the first embodiment exerts a greater force acting to return the piston to its cover abutting position than the spring 25 used in in the second embodiment. With both embodiments the tubular member does not have to rotate to move the plunger away from the spindle central axis as the tubular member can rotate relative to the respective spindle.

As an example of the invention but not as a limitation thereon, the working pressure of fluid applied to the cylinder bore 12 may be about 50 psi to 125 psi while the pressure of fluid to passage 67 may be, for example 3,000 psi. With the present invention a relatively small actuator can be used for operating a valve in a high pressure line between its "on" and its "off" conditions. Further the valve body 57 can be rotated relative to the actuator housing without breaking the fluid seal at the location the valve body first leg holds the diaphragm against the insert support since the valve body, bonnet and insert support can be rotated as a single unit relative to the housing body 11a. With reference to rotating the valve 56 relative to the housing body 11a, it is to be noted that the insert support is rotatable relative to the plunger about the central axis of the plunger.

The normally closed valve apparatus of the first embodiment of this invention can be converted to the normally open valve apparatus of the second embodiment. To facilitate the conversion a radial mark (radius line) 90 is provided on one end of the spindle while marks (lines) 91, 92 are provided on the corresponding side of the the actuator housing (see FIG. 8). When the apparatus is used as a normally closed mode and the piston abuts against the cover (FIG. 3 position), mark 90 is aligned with mark 91, while when the apparatus is used as a normally open mode with the piston abutting against the cover (FIG. 7 position), mark 90 is aligned with mark 92.

To make the conversion from the first embodiment to the second embodiment, the cover 13, piston 18, rack 30 and spring 22 are removed from the housing body 11a. Assuming the side of the housing having the marks 91, 92 thereon is the same side on which plate 33 is provided, plate 33 is removed. Now the spindle 47 is rotated 90° in the direction of arrow 93 and then the rack and piston are replaced and cover 13 secured to the housing. In the event marks 90, 92 are not now aligned the rack, piston and cover are again removed and the spindle rotated the appropriate amount and the rack, piston and cover are again replaced so that the mark 90, 92 are aligned. With the cover, piston and rack replaced with the cover secured to the housing 11 and marks 90, 92 aligned, the plate 33 is again secured to the housing 11. Now the apparatus will have its parts in the relative positions shown in FIG. 7. To convert from the second embodiment to the first embodiment, the same procedure is used except that spring 22 is again used and the spindle is rotated in the direction opposite arrow 93 to have mark 90 aligned with mark 91 when the members are reassemblied and no pressurized fluid is applied to the chamber 12. In the event the plates 32, 33 are adhesively adhered to the housing, than after the conversion, a new plate is adhered to the housing to replace the plate that was removed.

With reference to the valve, it is to be noted that instead of threaded portions 67b, 71b, the internal surfaces thereof may be smooth and appropriate fittings may be welded to the valve body for conducting fluid to and from the valve.

Figures 9, 10, 11:
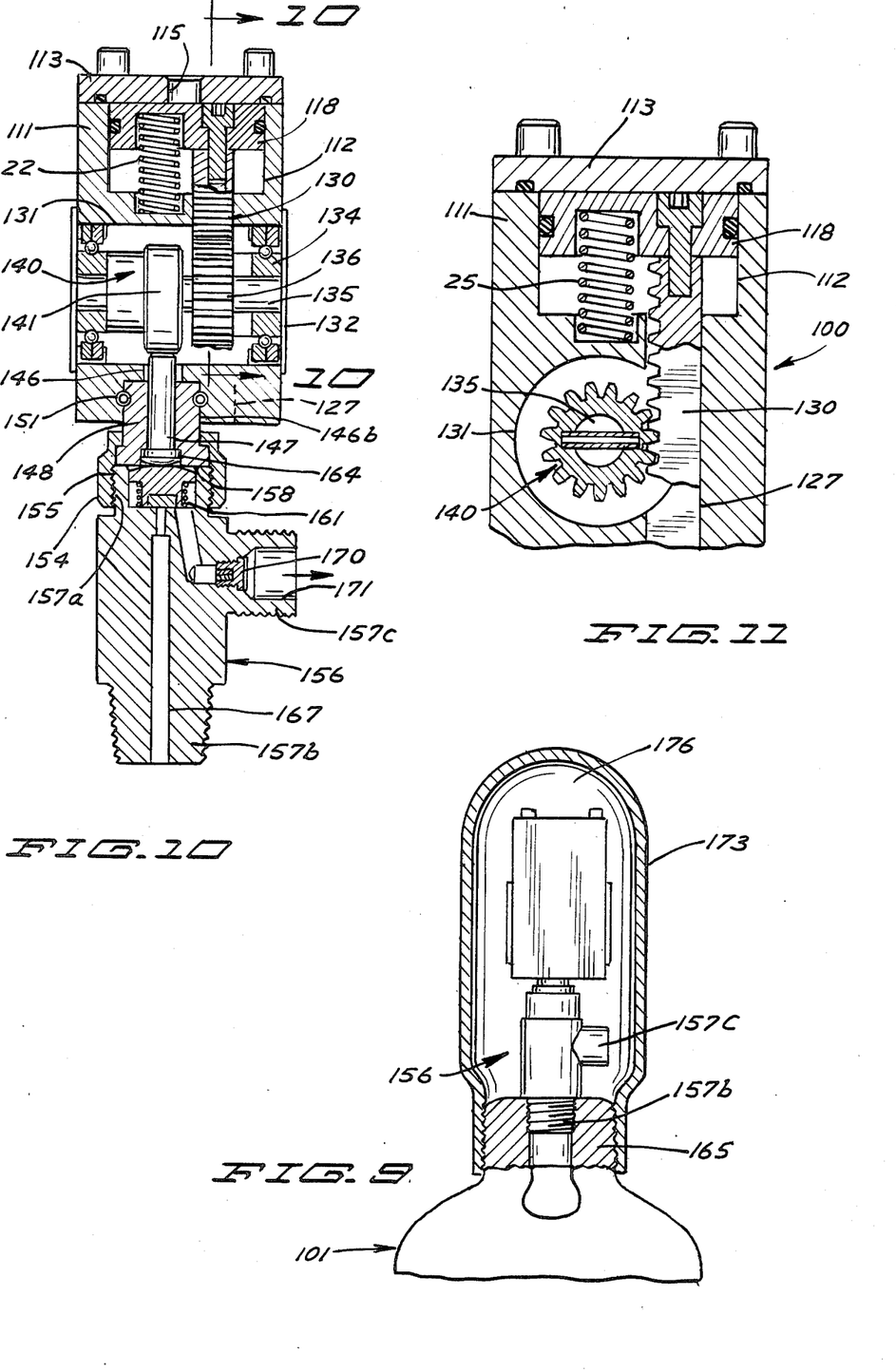
FIG. 9 in part shows a cross sectional view of a cap of a high pressure gas cylinder threaded onto the neck portion of the cylinder and in part a front view of the third embodiment of the invention mounted on the neck portion.
FIG. 10 is a cross sectional view of the third embodiment.
FIG. 11 is a fragmentary cross sectional view generally taken along the line and in the direction of the arrows 11—11 of FIG. 10.

The third embodiment of the invention, generally designated 100, is similar to the first embodiment other than the axial movement of the plunger is in a direction generally parallel to the direction of the reciprocal movement of the rack and the high pressure valve is of a construction for controlling the flow of pressurized gas from a gas cylinder, generally designated 101, for example of the type used in supplying gas used in industrial welding or cutting. Referring to FIGS. 9–11, the third embodiment includes an actuator having an actuator housing 111 that has a body with a cylindrical bore (chamber) 112. A piston 118 is mounted in chamber 112, coil springs 22, 25 being seatable in housing and piston bores as described with reference to the first embodiment.

A rack hole 127 is elongated in a direction parallel to the central axis of bore 112, at one end opens through the bottom surface of the actuator body and at the opposite end to the bottom of the cylinder bore 112. An elongated rack 130 has one end secured to the piston to move therewith. The wall portions defining hole 127 serve as a guide as the rack is reciprocated between its positions and permits fluid flow between the ambient atmosphere and the part of the chamber between the piston and the bottom of the cylinder bore as is also true for the first and second embodiments.

An eccentric subassembly, generally designated 140, which includes an eccentric lobe (cam) 141 that is of the safe construction as the cam 35, 41, 44 of the first embodiment, is mounted on a spindle 135. The spindle is rotatably mounted by bearings 134 in an eccentric subassembly bore 131 that opens through opposite sides of the housing, has its central axis extended perpendicular to the central axis of bore 112 and opens to the rack hole. Plates 132 and 133 close the opposite ends of bore 131 while the spindle has a spur gear 136 pinned thereto with the spur gear teeth in intermeshing relationship with the teeth of rack 130. The plates 132, 133 are removable to permit conversion between valve open and closed modes as described with reference to the first and second embodiments.

A plunger 147 has one end in abuttable relationship with the outer peripheral surface of cam 141 and extends through the reduced diameter portion of housing bore 146. Bore 146 has its central axis parallel to the central axis of bore 112. Bore 146 has an enlarged diameter portion 146b, an insert support 148 being mounted to extend into and rotatably retained therein by pins 151 as described with reference to the first embodiment. A bonnet 154 is mounted by the insert support 148 as described with reference to the first embodiment.

A conventional high pressure cylinder valve, generally designated 156, has a first leg 157a threaded into bore 155 of bonnet 154 to retain the non-perforated, flexible metal diaphragm 158 in abutting relationship to the insert support to prevent passage of fluid between the valve chamber 161 in the first leg and the plunger bore 160 of the insert support as described relative to the first embodiment. The plunger 147 extends axially through the insert support and has one end portion abutting against a button 164 which in turn abuts against the side of the diaphragm that is opposite the first leg 157a.

The valve 156 includes a second leg 157b threaded into the internally threaded part of the neck portion 165 of the gas cylinder, a fluid passage 167 opening to the cylinder interior and to the central part of the valve chamber that is axially opposite of the diaphragm from the button 164. A valve seat subassembly 168 is provided in the valve chamber in abutting relationship with the button and is resiliently moved to its "on" position to permit fluid flow from passage 167 to the valve chamber and is retained in its "off" position as described relative to the first embodiment.

The valve 156 includes a third leg 157c that has a fluid passage 171 for conducting fluid to a line (not shown) threaded on the leg which in turn is connected to a regulator or other control equipment (not shown). A safety plug 170 is threaded into passage 171 but is to be removed before use. The passage 171 opens to the valve chamber 161 so that fluid can flow from the chamber, regardless of whether or not the valve seat subassembly is in its "on" or "off" position.

A cylinder cap 173 that has internal threads that form a mating fit with the externally threaded neck portion of the cylinder is threaded onto the neck portion so the the valve 156 and valve acutator is protected from damage during transport and when otherwise moving the cylinder. With the third embodiment the cap is of a coventional size and shape and the third embodiment still fits within the cap chamber 176 when the cap is threaded onto the cylinder neck.

The operation of the third embodiment is similar to that of the first in that when pressurized fluid is applied through port 115, the piston moves the rack so that the spindle rotates to rotate the cam. As the cam rotates the plunger can move axially as a result of the flexing of the diaphragm by the valve seat subassembly moving to its "on" position. When pressurized fluid in chamber 112 is exhausted through port 115, the piston is resiliently moved whereby the cam is rotated to push the plunger to move the diaphragm and thereby the valve seat subassembly to the "off" position and retain the subassembly in the "off" position.

With the third embodiment the actuator assembly is transported with the gas cylinder and at the place of use the cylinder can be moved into a confined safety containment area. An appropriate line is connected to leg 157 and an actuator control line connected to port 115, and the lines extended outside of the confinement area. Now the valve 156 may be operated by remote control, i.e. no one has to go into the confinement area to start and stop flow of gas from the cylinder. This is a very important safety feature. Also the fact that the actuator mechanism is located within the cap is an important safety feature.

What is claimed is:

1. For operating a valve between open and closed conditions, a fluid operated actuator that is convertible from functioning in a normally open mode to a normally closed mode, comprising a housing having wall means defining a cylinder first bore and a second bore, said second bore having one end that opens to the ambient atmosphere, a valve operating plunger mounted in the housing for reciprocal movement between a valve open first position and a valve closed second position, a piston in the cylinder bore, a spring acting against said piston to resiliently retain the piston in a first position while permitting the piston to be operated under fluid pressure to a second position permitting the plunger moving to the plunger first position, a rack attached to the piston to move therewith, eccentric lobe means mounted in the housing second bore for removal through the second bore one end and being movable by movement of the rack between a first position abutting against the plunger and retaining the plunger in the plunger second position and a second position permitting the plunger moving to the plunger second position, said eccentric means including a spindle and a spur gear keyed to the spindle and selectively angularly positioned in intermeshing relationship with the rack for, in the valve open mode, piston first position, retaining the lobe means in the lobe means first position, the spindle having one end and a radial first mark on the spindle one end and the housing having a second and a third mark thereon that are adjacent to the second bore and the spindle one end and are in angular spaced relationship that one of the second and the third marks is angularly aligned with the first mark when the spindle is in an angular position in intermeshing relationship with the rack in the valve open mode, first position and that the other of the second and third marks is angularly aligned with the first mark when the spindle is in an angular position in intermeshing relationship with the rack in the rack valve closed mode, piston first position, and a cover removably secured to the housing for selectively closing the second bore open end and permitting removal and reinsertion of the eccentric lobe means into the second bore to convert between a valve open and a valve closed mode.

2. The apparatus of claim 1 further characterized in that there is provided a removable second spring for resiliently urging the piston to the piston first position that is used only for the valve closed mode.

3. The apparatus of claim 1 further characterized in that the eccentric means includes an eccentric keyed to the spindle to rotate therewith and cylindrical means rotatably mounted on the eccentric and abuttable against the plunger for moving the plunger from the plunger first position to the plunger second position when the spindle is rotated.

4. The apparatus of claim 1 further characterized in that the housing includes an actuator body having said first and second bores, the first bore having an open axial first end and a closed axial second end, and a cover removably secured to the actuator body to close the first bore first end, the cover having a port opening to the cylinder bore for applying pressurized fluid to the cylinder bore for moving the piston.

5. The apparatus of claim 4 further characterized in that the actuator body has wall means defining a rack hole that serves as a guide for the rack as the rack is moved by the piston and has one end opening through the cylinder bore closed end, an intermediate portion that opens to the second bore and an opposite end opening to the ambient atmosphere to permit fluid flow between the ambient atmosphere and the cylinder bore as the piston moves.

6. Fluid actuated valve apparatus, comprising valve means defining a valve body having a valve chamber, an inlet passage opening to the valve chamber, an outlet second passage opening to the valve chamber, valving means extending within the valve chamber and movable between a first position blocking fluid flow between the first and second passages and a second position permitting fluid flow between the first and second passages and means for resiliently retaining the valving means in the valving second position, and actuator means removably mounted on the valve means for moving the valving means from the valving means second position to the valving means first position, the actuator means including an actuator housing having a cylinder bore that has a central axis and a port for applying pressurized fluid to said bore, annular attaching means for removably attaching the valve means to the housing, plunger means having a reciprocal axis of movement extended within the housing, at least partially through the attaching means and into abuttable relationship to the valving means for moving from a plunger means first position that the valving means is in the valving means second position to a plunger means second position for forcing the valving means to move to the valving means first position, eccentric lobe means mounted in the housing in abuttable relationship to the plunger means for movement between a first position retaining the plunger means in the plunger means second position and a second position permitting the plunger means moving to the plunger means first position, and fluid pressure actuated means mounted in the housing and connected to the eccentric means for moving the eccentric means from one of the eccentric means positions to the other of the eccentric means positions, the pressure actuated means including a spindle mounted in the housing for rotation about about a spindle axis between a spindle first position and a spindle second position angularly spaced from the spindle first position, the eccentric means being mounted on the spindle for movement therewith to be in the eccentric means second position when the spindle is in the spindle second position, a spur gear in the housing pinned to the spindle to rotate therewith, a rack mounted in the housing for reciprocal movement relative to the housing and having teeth in intermeshing relationship with the spur gear to rotate the spur gear as the rack is reciprocated, a piston mounted in said bore for axial movement in one axial direction when pressurized fluid is applied to said port, said piston being attached to the rack to move the rack therewith and having a first surface and an axially opposite second surface against which fluid under pressure acts when applied through said port and a spring mounted in the housing and bearing against the piston first surface for moving the piston axially in a direction opposite the direction the piston is moved by fluid under pressure being applied through said port.

7. The apparatus of claim 6 further characterized in that the axis of movement of the plunger means is parallel to the cylinder bore axis.

8. The apparatus of claim 6 further characterized in that the axis of movement of the plunger means is generally perpendicular to the cylindrical bore central axis.

9. The apparatus of claim 6 further characterized in that the housing has wall portions defining a third bore that has a reduced diameter bore portion opening to the second bore and an enlarged diameter bore portion that opens to the third bore reduced diameter bore portion to define a third bore shoulder, and that the attaching means includes an insert support that has a central axis and is mounted by the housing for rotation relative to the housing while being retained in a fixed axial position, said insert support having a reduced diameter portion located in the third bore enlarged diamcter portion and an enlarged diameter portion spaced from the housing and joined to the insert support reduced diameter portion to form a shoulder facing the housing and an insert bore, and a bonnet having wall portions defining a reduced diameter bore through which the insert reduced diameter portion extends and an enlarged diameter bore portion opening to the bonnet reduced diameter bore portion to form a shoulder facing away from the housing, the bonnet and valve body first leg having cooperating threaded portions for connecting the valve body to the bonnet and retain the valve body and insert support in abutting and fluid sealing relationship to the diaphragm and the insert support shoulder and bonnet shoulder in abutting relationship, the plunger means extending through the housing reduced diameter bore portion and at least part of the way through the insert bore.

10. The apparatus of claim 6 further characterized in that there is provided a gas cylinder having an externally threaded neck portion, an interior and an internally threaded neck portion opening to the interior and a gas cylinder cap to in conjunction with the gas cylinder define a chamber in which the actuator means is located, the cap having threads mating with the externally threaded neck portion, further characterized in that the valve body includes a leg having threads mating with the internally threaded neck portion, the inlet passage opening through said leg to the gas cylinder chamber interior.

11. The apparatus of claim 6 further characterized in that the valve means includes a valve body having a first leg that has the valve chamber opening therethrough, and that the attaching means includes means for connecting the first leg to the actuator housing, that the valving means includes a non-perforated flexible diaphragm retained in fluid sealing relationship between the first leg and the means for connecting the first leg, a valve seat subassembly in the valve chamber movable between a first position blocking fluid flow between the passages and a second position permitting fluid flow between said passages, and spring means in the valve chamber for resiliently retaining the seat subassembly in abutting relationship with the diaphragm and resiliently urging the seat subassembly toward the seat subassembly second position, the plunger means in the plunger means second position abutting against the diaphragm to hold the diaphragm in a flexed condition for retaining the seat subassembly in its first position.

12. The apparatus of claim 6 further characterized in that the housing has a second bore that has axially opposite ends that open through the housing, the spindle, spur gear and eccentric means being located in the second bore and the plunger means in at least one of the plunger means positions extending into said second bore.

13. The apparatus of claim 12 further characterized in that the valve means includes a valve body having a first leg that has the valve chamber opening therethrough, the first leg being connected to the housing by the attaching means, and that the valving means includes a flexible diaphragm that extends across the valve chamber and is retained in fluid sealing relationship between the first leg and the attaching means, and a valve seat subassembly in the valve chamber that is resiliently retained in abutting relationship with the diaphragm, the plunger means including a plunger in abuttable relationship with the diaphragm for flexing the diaphragm and thereby moving the valve seat subassembly.

14. The apparatus of claim 13 further characterized in that the housing has wall portions defining a third bore that has a reduced diameter bore portion opening to the second bore and an enlarged diameter bore portion that open to the third bore reduced diameter bore portion to define a third bore shoulder, and that the connecting means includes an insert support that has a central axis and is mounted by the housing for rotation relative to the housing while being retained in a fixed axial position, said insert support having a reduced diameter portion located in the third bore enlarged diameter portion and an enlarged diameter portion spaced from the housing and joined to the insert support reduced diameter portion to form a shoulder facing the housing and an insert bore, and a bonnet having wall portions defining a reduced diameter bore portion through which the insert reduced diameter portion extends and an enlarged diameter bore portion opening to the bonnet reduced diameter bore portion to form a shoulder facing away from the housing, the bonnet and valve body first leg having cooperating threaded portions for connecting the valve body to the bonnet and retain the first leg and insert support in fluid sealing relationship to the diaphragm and the insert support shoulder and bonnet shoulder in abutting relationship, the plunger means extending through the housing reduced diameter bore portion and at least part of the way through the insert bore.

15. Fluid actuated valve apparatus comprising valve means having a first leg that has a valve chamber in the first leg, the valve means also including an inlet passage opening to the valve chamber, an outlet passage opening to the valve chamber, and movable between a first position blocking fluid flow between said passages and a second position permitting fluid flow between said passages, and first spring means abutting against the valving means to resiliently urge the valving means to one of the first and second positions of the valving means positions, and a fluid pressure actuated actuator mounted on the first leg for selectively moving the valving means from the position the valving means is resiliently retained in to the other position of the valving means, the actuator including a housing having a bore, annular means for being mounted on the first leg and having an axial bore extending therethrough that opens to the housing bore and to the valving chamber, means for removably attaching the the annular means to the housing with the annular means extending into the housing bore, plunger means mounted in the axial bore for axial reciprocal movement relative to the housing and annular means and having a first end located within the housing and being abuttable against the valving means, and fluid pressure operated means mounted in the housing in abuttable relationship with the plunger means first end to axially move the plunger means to force the valving means from the position that the valving means is resiliently urged to.

16. The apparatus of claim 15 further characterized in that the first leg has a threaded portion and that the annular means comprises an annular insert having a reduced diameter portion extended into said housing bore, and an enlarged diametric portion joined to the above reduced diameter portion to at the juncture with the reduced diameter portion form an annular shoulder, and a bonnet having an enlarged diameter bore portion threaded on the first leg and a reduced diameter bore portion opening to the bonnet enlarged diameter bore portion to provide a shoulder that seats on the insert shoulder, said insert and bonnet bore portions being at least part of the annular means bore, that the means for removably attaching removably attaches the insert to the housing, and that the housing has a cylinder chamber and an inlet port opening to the cylinder chamber for applying fluid under pressure to the cylinder chamber, and that the pressure operated means includes a piston mounted in the cylinder chamber to move away from the port when fluid under pressure is applied thereto, a rack mounted in the housing and attached to the piston to move therewith, second spring means mounted in the housing for urging the piston toward the opening of the port to the cylinder chamber and moving the piston toward the port when the application of fluid under pressure to the port is discontinued, and means operated by the movement of the rack for moving the plunger means to move the valving means from the position the valving means is resiliently urged to, the plunger means extending at least partially through the insert.

17. The apparatus of claim 16 further characterized in that the means operated by the movement of the rack includes eccentric means rotatably mounted in the housing, the plunger means being axially moved by the rotation of the eccentric means for moving the valving means from the valving means first position to the valving means second position.

18. The apparatus of claim 17 further characterized in that the second spring means includes a spring bearing against the piston to resiliently urge the piston to a datum position adjacent to the opening of the port to the cylinder chamber and that the valving means includes a flexible diaphragm, and a valve seat subassembly movable in the valve chamber between a first position blocking fluid flow from the inlet passage to the valve chamber and a second position permitting fluid flow from the first passage, through the valve chamber and to the outlet passage, the first spring means resiliently retaining the subassembly in abutting relationship to the diaphragm.

19. The apparatus of claim 18 further characterized in that the plunger means abuts against the diaphragm to retain the valve seat subassembly in the seat subassembly first position when the piston is in the datum position of the piston.

20. The apparatus of claim 18 further characterized in that the plunger means abuts against the diaphragm to flex the diaphragm to move the valve seat subassembly toward the seat subassembly first position when fluid under pressure is applied to the inlet port and moves the piston away from the piston datum position against the action of said spring.

21. The apparatus of claim 15 further characterized in that the annular means has an outer peripheral annular groove that opens radially outwardly and has diametrically opposite portions, and that the means for removably attaching the annular means comprises a pair of pins mounted in the housing in diametrically spaced parallel relationship and extending through the diametrically opposite portions of the groove for retaining the annular means in fixed axial relationship thereto while permitting relative rotation between the first leg and the housing.

* * * * *

UNITED STATES PATENT AND TRADEMARK OFFICE
CERTIFICATE OF CORRECTION

PATENT NO. : 4,700,735

DATED : Oct. 20, 1987

INVENTOR(S) : Edward L. Hamernik et al

It is certified that error appears in the above-identified patent and that said Letters Patent is hereby corrected as shown below:

Column 5, line 21 change "1" to --18--; Column 8, line 26, change "safe" to --same--; and Column 12, line 60, change "open" to --opens--.

Signed and Sealed this

Twenty-sixth Day of April, 1988

Attest:

DONALD J. QUIGG

Attesting Officer

Commissioner of Patents and Trademarks